(12) United States Patent
Sekiguchi et al.

(10) Patent No.: US 11,425,550 B2
(45) Date of Patent: Aug. 23, 2022

(54) RADIO APPARATUS, RADIO COMMUNICATION SYSTEM, AND RADIO COMMUNICATION METHOD

(71) Applicant: JVCKENWOOD CORPORATION, Yokohama (JP)

(72) Inventors: Tomomi Sekiguchi, Kanagawa (JP); Eiiti Hosono, Kanagawa (JP)

(73) Assignee: JVCKENWOOD CORPORATION, Yokohama (JP)

( * ) Notice: Subject to any disclaimer, the term of this patent is extended or adjusted under 35 U.S.C. 154(b) by 162 days.

(21) Appl. No.: 16/936,246

(22) Filed: Jul. 22, 2020

(65) Prior Publication Data
US 2021/0029527 A1 Jan. 28, 2021

(30) Foreign Application Priority Data
Jul. 24, 2019 (JP) .............................. JP2019-135764

(51) Int. Cl.
*H04W 4/90* (2018.01)
*G10L 15/22* (2006.01)
*G10L 15/08* (2006.01)

(52) U.S. Cl.
CPC .............. *H04W 4/90* (2018.02); *G10L 15/08* (2013.01); *G10L 15/22* (2013.01); *G10L 2015/088* (2013.01); *G10L 2015/223* (2013.01)

(58) Field of Classification Search
CPC .......... H04W 4/90; G10L 15/08; G10L 15/22; G10L 2015/088; G10L 2015/223; G10L 15/00; G10L 25/48
See application file for complete search history.

(56) References Cited

U.S. PATENT DOCUMENTS

| | | | |
|---|---|---|---|
| 2010/0291894 A1* | 11/2010 | Pipes | H04W 4/02 455/404.2 |
| 2014/0099910 A1* | 4/2014 | Corretjer | H04L 69/14 455/404.1 |
| 2014/0106677 A1* | 4/2014 | Altman | H04B 1/3827 455/552.1 |
| 2016/0142894 A1* | 5/2016 | Papakonstantinou | G16H 40/67 455/404.1 |
| 2017/0228995 A1* | 8/2017 | Hosoi | H04R 1/02 |

FOREIGN PATENT DOCUMENTS

JP 2013-232785 A 11/2013

* cited by examiner

*Primary Examiner* — Dinh Nguyen
(74) *Attorney, Agent, or Firm* — Procopio, Cory, Hargreaves & Savitch LLP (57) ABSTRACT

A radio apparatus includes a communication unit configured to wirelessly communicate with a radio apparatus at the other end of the communication, a proxy call information acquisition unit configured to acquire proxy call information from the radio apparatus at the other end through the radio communication, the proxy call information being information that is required in case of an emergency of the radio apparatus at the other end, and a proxy call unit configured to make an emergency call on behalf of the radio apparatus at the other end based on the proxy call information.

6 Claims, 11 Drawing Sheets

RADIO APPARATUS, RADIO COMMUNICATION SYSTEM, AND RADIO COMMUNICATION METHOD

CROSS REFERENCE TO RELATED APPLICATION

This application is based upon and claims the benefit of priority from Japanese patent application No. 2019-135764, filed on Jul. 24, 2019, the disclosure of which is incorporated herein in its entirety by reference.

BACKGROUND

The present disclosure relates to a radio apparatus, a radio communication system, and a radio communication method.

As radio apparatuses such as radio systems for business use have become widespread, there are increasing cases in which users of radio apparatus fall into various adverse situations. Therefore, it has been desired to improve security measures. As one of such measures, radio apparatuses are equipped with emergency call functions. For example, when a taxi driver is attacked by a robber while he/she is using a radio apparatus, an emergency call for reporting the dangerous situation is transmitted to a management system by an operation or the like performed by the driver.

Japanese Unexamined Patent Application Publication No. 2013-232785 discloses related art. In particular, Japanese Unexamined Patent Application Publication No. 2013-232785 discloses that an emergency call or the like is made from a mobile phone when a scream is contained in a voice input to the mobile phone.

SUMMARY

In the related art such as the one disclosed in Japanese Unexamined Patent Application Publication No. 2013-232785, when a radio apparatus used by a speaker detects a scream of the speaker through voice recognition processing, the radio apparatus automatically starts an emergency call. However, the related art does not assume a case in which, in case of an emergency, an emergency call cannot be made from the radio apparatus used by the speaker.

An embodiment provides a radio apparatus including: a communication unit configured to wirelessly communicate with a radio apparatus at the other end of the communication; a proxy call information acquisition unit configured to acquire proxy call information from the radio apparatus at the other end through the radio communication, the proxy call information being information that is required in case of an emergency of the radio apparatus at the other end; and a proxy call unit configured to make an emergency call on behalf of the radio apparatus at the other end based on the proxy call information.

Another embodiment provides a radio communication system including: a radio apparatus on a speaking side; and a radio apparatus on a listening side, in which the radio apparatus on the speaking side includes: a communication unit configured to wirelessly communicate with the radio apparatus on the listening side; and a proxy call information transmitting unit configured to transmit proxy call information to the radio apparatus on the listening side through the radio communication, the proxy call information being information that is required in case of an emergency of the radio apparatus on the speaking side, and the radio apparatus on the listening side includes: a communication unit configured to wirelessly communicate with the radio apparatus on the speaking side; a proxy call information acquisition unit configured to acquire the proxy call information from the radio apparatus on the speaking side through the radio communication; and a proxy call unit configured to make an emergency call on behalf of the radio apparatus on the speaking side based on the proxy call information.

Another embodiment provides a radio communication method including: wirelessly communicating with a radio apparatus at the other end of the communication; acquiring proxy call information from the radio apparatus at the other end through the radio communication, the proxy call information being information that is required in case of an emergency of the radio apparatus at the other end; and making an emergency call on behalf of the radio apparatus at the other end based on the proxy call information.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
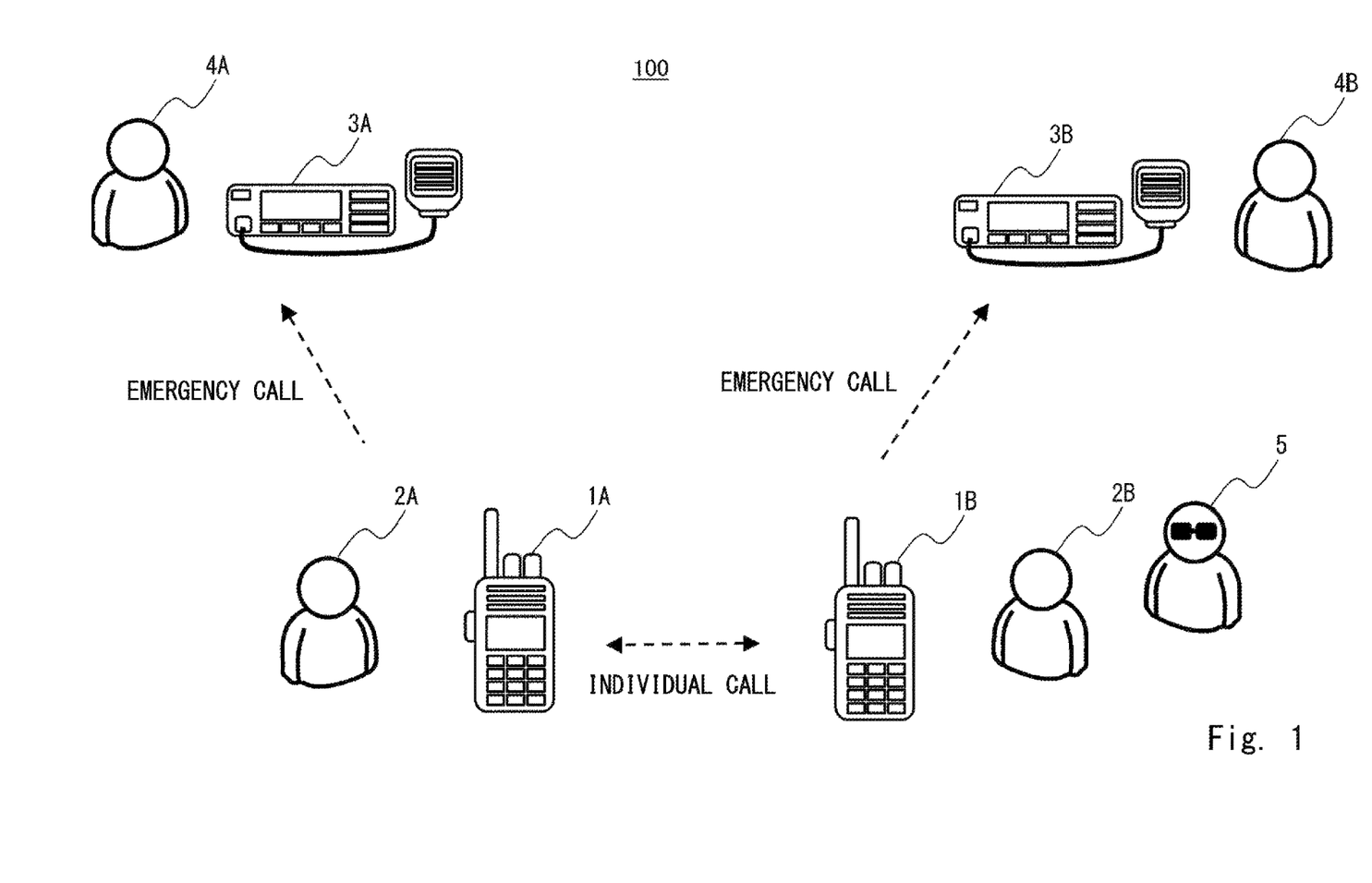
FIG. 1 is a block diagram showing an example of a configuration of a radio communication system according to a first embodiment.

A first embodiment will be described hereinafter with reference to the drawings. FIG. 1 shows an example of a configuration of a radio communication system according to this embodiment. As shown in FIG. 1, a radio communication system 100 according to this embodiment is, for example, a radio communication system for business use, and includes a plurality of radio apparatuses 1 and a plurality of system radio apparatuses 3 all of which wirelessly communicate with each other. Each of the radio apparatuses 1 and the system radio apparatuses 3 is a so-called transceiver and makes a call by a PTT (Push to Talk) method using a session in accordance with a half-duplex communication technique. In the PTT method, a radio apparatus in which a call button is being pressed can transmit a voice. Note that in the following descriptions, an example in which the radio apparatuses 1 and the system radio apparatuses 3 transmit and receive voice data and thereby make voice calls is mainly described. However, other types of data may be transmitted and received instead of or in addition to the voice data. Further, if necessary, the radio communication system 100 may include a repeater or the like that relays radio communication.

Each of the radio apparatuses 1 is a mobile portable radio apparatus, and can make an emergency call to the system radio apparatus 3 in response to an operation performed by a speaker/listener 2 or automatically in case of an emergency. Each of the system radio apparatuses 3 is a fixed-type radio apparatus that manages a system composed of a plurality of radio apparatuses 1, and can receive an emergency call from the radio apparatuses 1.

In this example, there are radio apparatuses 1A and 1B used by speakers/listeners (also referred to as speakers or listeners) 2A and 2B, respectively, and system radio apparatuses 3A and 3B used by operators 4A and 4B, respectively. The radio apparatuses 1A and 1B can make individual calls or the like according to operations performed by the speakers/listeners 2A and 2B, respectively. For example, they may be configured so that in case of an emergency in which, for example, the speaker/receiver of the radio apparatus 1A is attacked by an assailant 5, the radio apparatus 1A makes an emergency call to the system radio apparatus 3A, and in case of an emergency in which the speaker/receiver of the radio apparatus 1B is attacked by an assailant 5, the radio apparatus 1B makes an emergency call to the system radio apparatus 3B. It is possible to make various settings in the radio apparatus 1 by using a purpose-built PC application (e.g., an application program for a personal computer). Further, it is also possible to set information necessary for an emergency call, such as a destination information for an emergency call or the like by using a PC application.

<Operation in First Examined Example>

In order to help this embodiment to be understood, a first examined example to which this embodiment is not applied will be described. In the first examined example, when a radio apparatus used by a speaker detects a scream of the speaker through voice recognition processing, an emergency call can be automatically made. However, there is a problem that, for example, if the battery of the radio apparatus is immediately removed by the assailant or if the battery is detached as the speaker accidentally drops the radio apparatus during the period from the detection of the scream to the start of the transmission of the emergency call, the radio apparatus on the speaking side may not make the emergency call.

Figure 2:
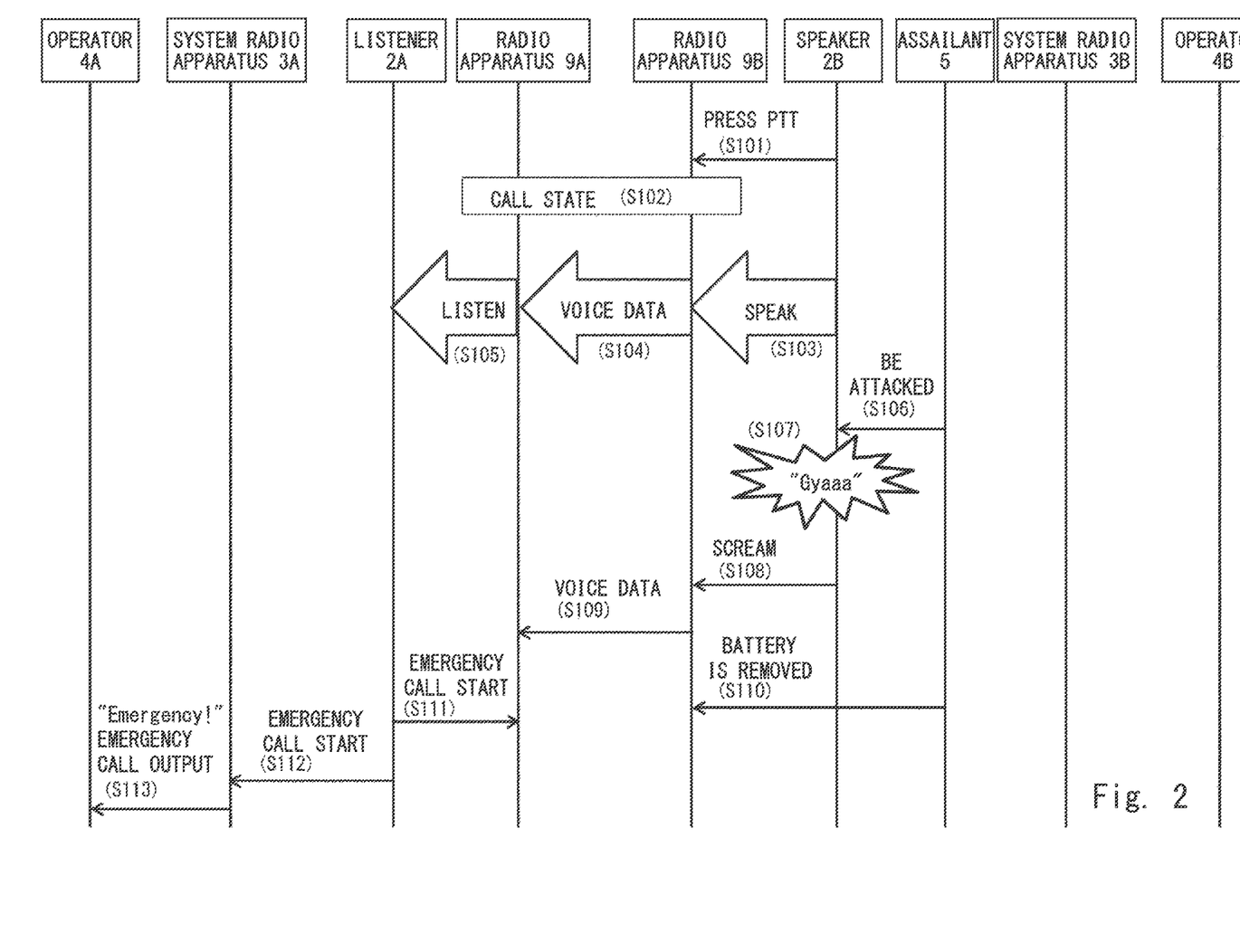
FIG. 2 is a sequence diagram showing an example of operations performed by a radio apparatus according to a first examined example.

FIG. 2 shows operations in the first examined example in which the above-described problem occurs. Note that the radio apparatus in the first examined example is referred to as a radio apparatus 9. FIG. 2 shows a situation in which a speaker 2B is attacked by an assailant 5 during a voice call from the speaker 2B to a listener 2A.

Firstly, when the speaker 2B presses a PTT button of the radio apparatus 9B (S101), the radio apparatus 9B enters a call state in which the radio apparatus 9B transmits a voice to the radio apparatus 9A (S102). That is, the radio apparatus 9B alerts for call (or calls) the radio apparatus 9A in response to an operation performed by the speaker 2B, and the radio apparatus 9A responds to the alert in response to an operation performed by the listener 2A, so that a call (i.e., communication) is started therebetween.

Next, the speaker 2B speaks to the radio apparatus 9B and thereby inputs a voice thereto (S103). When the speaker 2B speaks in the state in which the PTT button of the radio apparatus 9B is being pressed, the radio apparatus 9B transmits its voice data to the radio apparatus 9A (S104). Further, upon receiving the voice data, the radio apparatus 9A outputs the voice to the listener 2A, so that the listener 2A can hear the voice of the speaker 2B (S105).

It is assumed that in this state, the speaker 2B is attacked by an assailant 5 (S106) and the speaker 2B lets out a "scream" (S107). As a result, the "scream" of the speaker 2B is input to the radio apparatus 9B (S108). Further, the voice data of the "scream" is transmitted from the radio apparatus 9B (S109) and the voice data is received by the radio apparatus 9A.

At this point, if the battery of the radio apparatus 9B is removed by the assailant 5 (S110), or if the battery is detached as the speaker 2B accidentally drops the radio apparatus 9B, the radio apparatus 9B cannot make an emergency call on its own as described above as the problem in the related art. That is, in first examined example, since the radio apparatus 9A did not perform voice recognition for the "scream" and the radio apparatus 9A did not have a function of making an emergency call on behalf of the radio apparatus 9B, the emergency situation of the radio apparatus 9B cannot be reported to the system radio apparatus 3B. In the first examined example, even if the listener 2A instructs the radio apparatus 9A to start an emergency call (S111), the radio apparatus 9A starts and transmits the emergency call to the system radio apparatus 3A, which is the destination of its own emergency call (S112). The radio apparatus 9A transmits its own identification ID and GPS position information to the system radio apparatus 3A, and the system radio apparatus 3A outputs the emergency call of the radio apparatus 9A having these identification ID and GPS position information for the operator 4A (S113). As described above, in the first examined example, even if the radio apparatus on the speaking side can automatically make an emergency call through voice recognition or the like, the radio apparatus on the speaking side may not be able to make the emergency call because of its battery situation or the like.

<Operation in First Embodiment>

In view of the problem described above in the first examined example, this embodiment is configured so that when the radio apparatus 1A on the listening side detects a "scream", or detects a "keyword" in response to which the crisis in the radio apparatus 1B on the speaking side is reported in a voice signal sent from the radio apparatus 1B, for example, through voice recognition, the radio apparatus 1A transmits (i.e., make) an emergency call on behalf of the radio apparatus 1B. In the case of an ordinary emergency call, the radio apparatus transmits its own identification ID and GPS position information to its own system. In contrast, in the proxy emergency call according to this embodiment, the radio apparatus 1A transmits an identification ID and GPS position information, which were received from the radio apparatus 1B in advance during a call therewith, to the system of the radio apparatus 1B.

Figure 3:
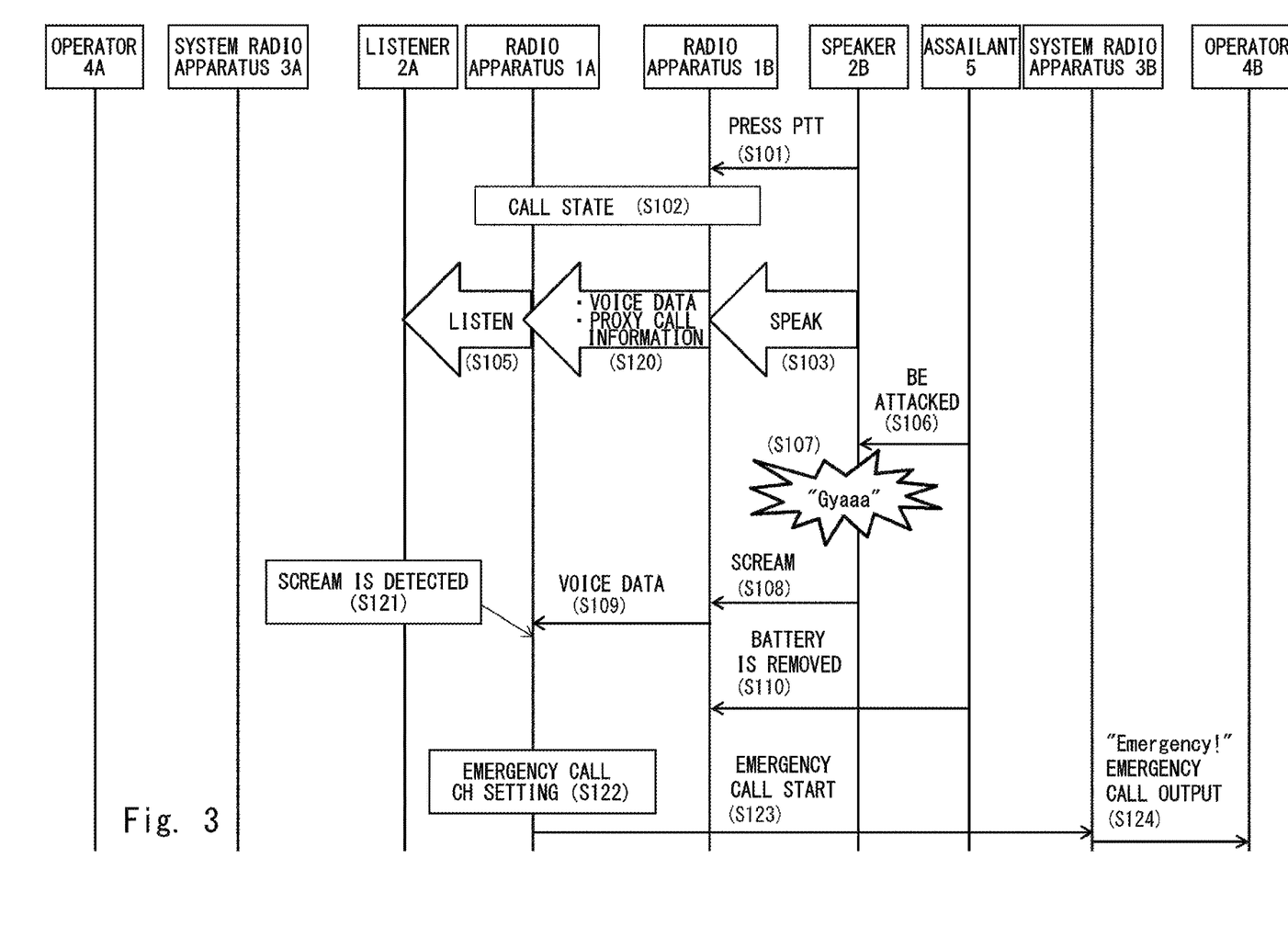
FIG. 3 is a sequence diagram showing an example of operations performed by the radio apparatus according to the first embodiment.

FIG. 3 shows operations performed by a radio communication system according to this embodiment, i.e., performed in a case in which this embodiment is applied to the first examined example shown in FIG. 2.

As shown in FIG. 3, firstly, it is in a call state in which a voice is transmitted from the radio apparatus 1B of the speaker 2B to the radio apparatus 1A of the listener 2A (S102) as in the case of FIG. 2.

Next, when the speaker 2B speaks to the radio apparatus 1B and thereby inputs a voice thereto (S103), the radio apparatus 1B transmits its voice data to the radio apparatus 1A (S120) and the radio apparatus 1A outputs the voice to the listener 2A (S105). In this embodiment, during a call from the speaker 2B to the listener 2A, the radio apparatus 1B transmits proxy call information including its identification ID, GPS position information data, and emergency call information such as a transmission destination of an emergency call and information about a CH (channel) frequency to the radio apparatus 1A (S120) so that the radio apparatus 1A can make an emergency call on behalf of the radio apparatus 1B at any time. It is preferable that the proxy call information should be able to be transmitted in a state in which the radio apparatus is performing a call (i.e., performing communication) with the radio apparatus at the other end of the call (hereinafter simply expressed as "at the other end"). For example, an arbitrary multiplexing method such as time division multiplexing or frequency multiplexing may be used. Alternatively or additionally, a free channel, a free area in a frame, or the like may be used.

In this state, when the speaker 2B is attacked by an assailant 5 (S106) and the speaker 2B lets out a "scream" (S107), the "scream" of the speaker 2B is input to the radio apparatus 1B (S108) and the voice data of the "scream" is transmitted from the radio apparatus 1B (S109). In this embodiment, the radio apparatus 1A analyzes voice data received from the radio apparatus 1B at all times and thereby performs a process for detecting a "scream", or a "keyword" in response to which a crisis in the radio apparatus 1B is reported.

When the radio apparatus 1A detects a "scream" from the radio apparatus 1B (S121), it adjusts the CH setting to the one for an emergency call which was received in advance from the radio apparatus 1B (S122) and starts the emergency call to the system radio apparatus 3B which is the destination of the emergency call of the radio apparatus 1B (S123). For example, the radio apparatus 1A makes a proxy call by setting the ID of the system radio apparatus 3B as the destination of the start frame of the emergency call to be transmitted, and setting the ID of the radio apparatus 1B as the source of the transmission (i.e., as the entity from which the emergency call is transmitted). The radio apparatus 1A transmits the identification ID and GPS position information of the radio apparatus 1B to the system radio apparatus 3B, and the system radio apparatus 3B outputs the emergency call of the radio apparatus 1B having these identification ID and GPS position information for the operator 4B (S124).

<Configuration and Operation of Radio Apparatus in First Embodiment>

Figure 4:
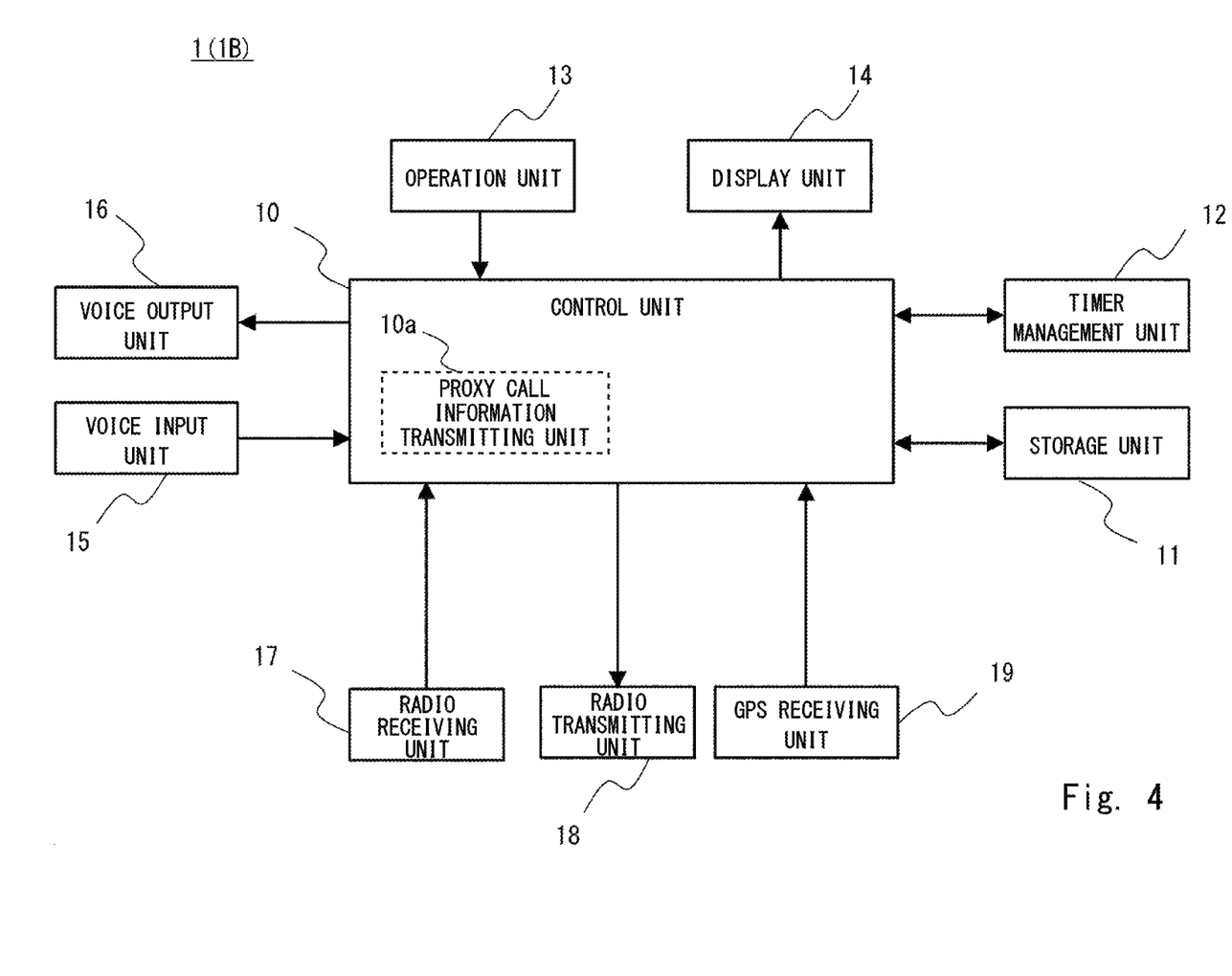
FIG. 4 is a block diagram showing an example of a configuration of the radio apparatus according to the first embodiment.
Figure 5:
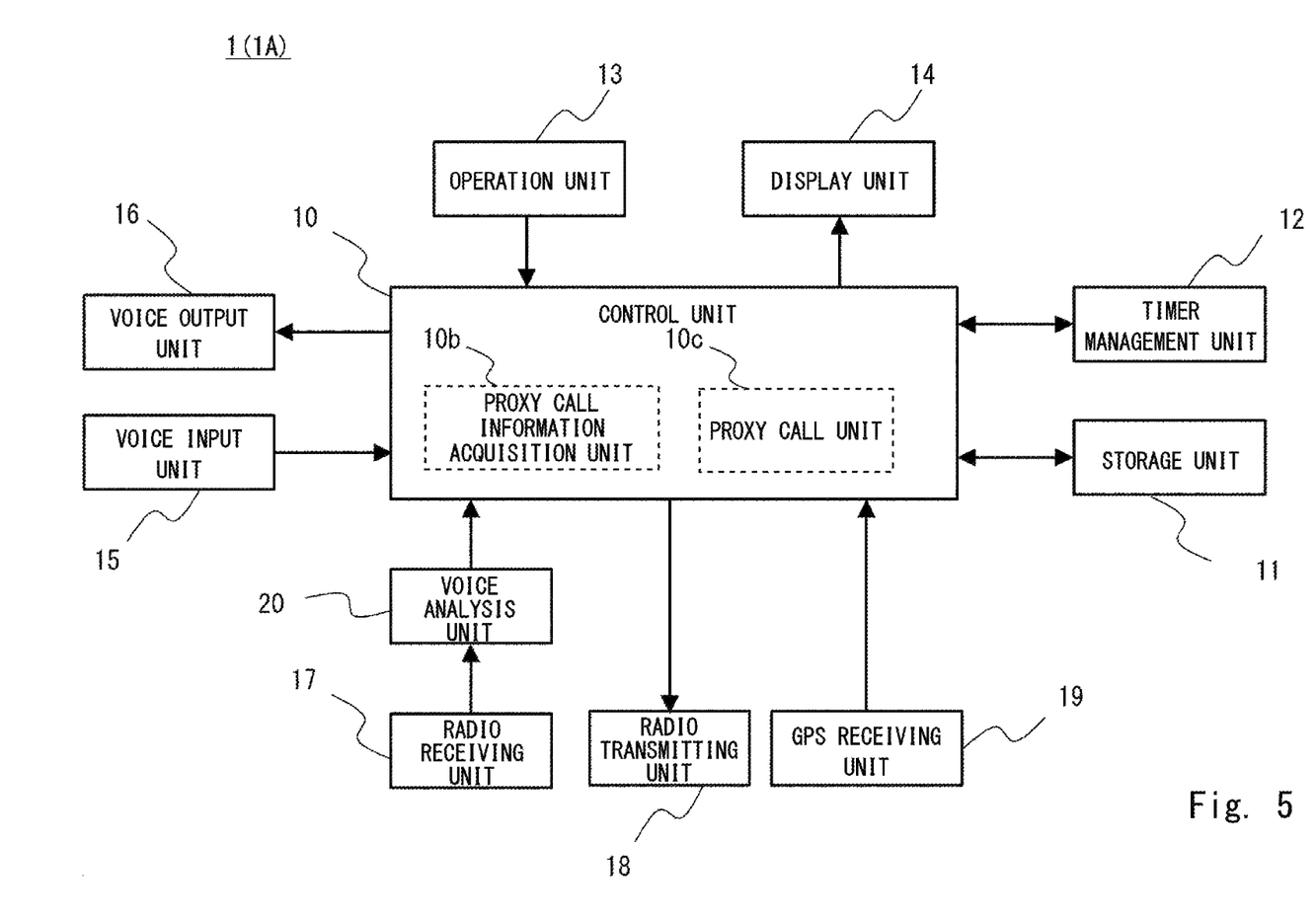
FIG. 5 is a block diagram showing an example of a configuration of the radio apparatus according to the first embodiment.

FIG. 4 shows an example of a configuration of a radio apparatus 1 on the speaking side (e.g., the radio apparatus 1B) according to this embodiment, and FIG. 5 shows an example of a configuration of a radio apparatus 1 on the listening side (e.g., the radio apparatus 1A) according to this embodiment.

As shown in FIGS. 4 and 5, each of the radio apparatuses 1 on the speaking side and the listening side according to this embodiment includes a control unit 10, a storage unit 11, a timer management unit 12, an operation unit 13, a display unit 14, a voice input unit 15, a voice output unit 16, a radio receiving unit 17, a radio transmitting unit 18, and a GPS receiving unit 19. As shown in FIG. 5, the radio apparatus 1 on the listening side (hereinafter also referred to as the listening-side radio apparatus 1) further includes a voice analysis unit 20. The radio apparatus 1 on the speaking side (hereinafter also referred to as the speaking-side radio apparatus 1) may also include a voice analysis unit 20. Note that each of the configurations shown in FIGS. 4 and 5 is a mere example. That is, other configurations may be adopted as long as the radio apparatus 1 can perform the operations according to this embodiment. For example, some of the components shown in FIGS. 4 and 5 may be formed as one or any number of blocks or devices. Further, in this example, the speaking-side radio apparatus 1 and the listening-side radio apparatus 1 has configurations different from each other. However, the speaking-side radio apparatus 1 and the listening-side radio apparatus 1 may have configurations identical to each other. Further, one radio apparatus 1 may have both the configuration on the speaking side shown in FIG. 4 and the configuration on the listening side shown in FIG. 5.

The control unit 10 is a control unit that controls necessary operations based on information input from each component of the radio apparatus 1. In the speaking-side radio apparatus 1, the control unit 10 includes a proxy call information transmitting unit 10a that transmits proxy call information required in case of an emergency of the speaking-side radio apparatus 1, such as emergency call information, to the listening-side radio apparatus 1. The proxy call information is, for example, an identification ID and GPS position information data of the radio apparatus, and emergency call information such as a transmission destination of an emergency call and information about a CH frequency. However, the proxy call information may be other information necessary for the proxy call. In the listening-side radio apparatus 1, the control unit 10 includes, for example, a proxy call information acquisition unit 10b that acquires proxy call information such as emergency call information from the speaking-side radio apparatus 1, and a proxy call unit 10c that makes an emergency call on behalf of the speaking-side radio apparatus 1. For example, the function of the control unit 10 is implemented by having a processor such as a CPU (Central Processing Unit) execute a program stored in the storage unit 11.

The storage unit 11 stores programs and data necessary for the operations performed by the radio apparatus 1. The storage unit 11 stores an identification ID, GPS information, emergency call information, and the like of its own radio apparatus 1. Further, in the listening-side radio apparatus 1, the storage unit 11 stores proxy call information such as an identification ID, GPS information, and emergency call information on the speaking side acquired from the speaking-side radio apparatus 1. For example, the storage unit 11 is a nonvolatile memory such as a flash memory, a hard disk drive, or the like.

The timer management unit 12 manages operations of a timer necessary for communication control and the like according to an instruction from the control unit 10. The operation unit 13 is an operation unit that the speaker 2B or the listener 2A operates in order to make a desired call. The operation unit 13 includes a PTT button for making a call, selecting keys for selecting the destination of the call and/or a channel used for the call, and so on. For example, the operation unit 13 may include various keys and switches, or may be a touch panel. The display unit 14 is a display unit that displays images according to the operation performed by the speaker 2B or the listener 2A, or according to the radio communication. The display unit 14 is, for example, a liquid crystal display or an organic EL (Electro-Luminescence) display.

The voice input unit 15 is an input unit that receives a voice for a call from the speaker 2B or the listener 2A, and is, for example, a microphone or the like. A voice can be input to the voice input unit 15 in a state in which the PTT button is being pressed. The voice output unit 16 is an output unit that outputs a voice received from the radio apparatus 1 at the other end, and is, for example, a speaker unit or the like. A voice that is received during a call state is output from the voice output unit 16.

The radio receiving unit 17 is a receiving unit that receives a radio signal from the radio apparatus 1 at the other end, and receives a radio signal in a set channel. The radio transmitting unit 18 is a transmitting unit that transmits a radio signal to the radio apparatus 1 at the other end, and transmits a radio signal in a set channel. The radio transmitting unit 18 transmits a voice that is input in a state in which the PTT button is being pressed. The radio receiving unit 17 and the radio transmitting unit 18 are also considered to be a communication unit that wirelessly communicates with other radio apparatuses 1. In response to an instruction from the control unit 10, the radio transmitting unit 18 multiplexes proxy call information into the voice data and wirelessly transmits the multiplexed voice data. The radio receiving unit 17 receives a multiplexed radio signal and demultiplexes the received multiplexed radio signal into voice data and proxy call information. The GPS receiving unit 19 is a position acquisition unit that receives radio waves from GPS (Global Positioning System) satellites and acquires information about the current position (a longitude and a latitude).

The voice analysis unit (voice recognition unit) 20 in the listening-side radio apparatus 1 includes an interface for receiving a voice signal from the radio receiving unit 17, and the voice analysis unit 20 recognizes a voice of the voice signal received by the radio receiving unit 17 from the radio apparatus 1 at the other end. The voice analysis unit 20 recognizes a predetermined voice in response to which an emergency call should be made on behalf of the radio apparatus 1 at the other end. The predetermined voice to be recognized includes predetermined keywords. For example, predetermined voice may be a voice for informing other people of a danger, such as a scream, a voice for seeking for a help, or the like. For example, the predetermined voice is "Gyaaa", "Kyaaa", "Wow", "Help me", or the like. Further, it is preferable to take voice parameters such as an instantaneous volume of a voice, and a pitch of a voice into consideration. For example, a voice having a volume higher than a predetermined volume in a short period may be recognized as a predetermined voice. Note that the method for recognizing a voice is not limited to any particular methods. For example, machine learning or an arbitrary voice recognition technique may be used.

Note that this embodiment is not limited to the recognition of a predetermined voice. That is, the radio apparatus may make an emergency call on behalf of the radio apparatus at the other end in other situations. For example, when the radio apparatus acquires information for instructing to make a proxy emergency call from the radio apparatus at the other end, it may make an emergency call on behalf of the radio apparatus at the other end. Further, the listening-side radio apparatus may make an emergency call on behalf of the radio apparatus at the other end according to an operation performed by the listener.

Figure 6A:
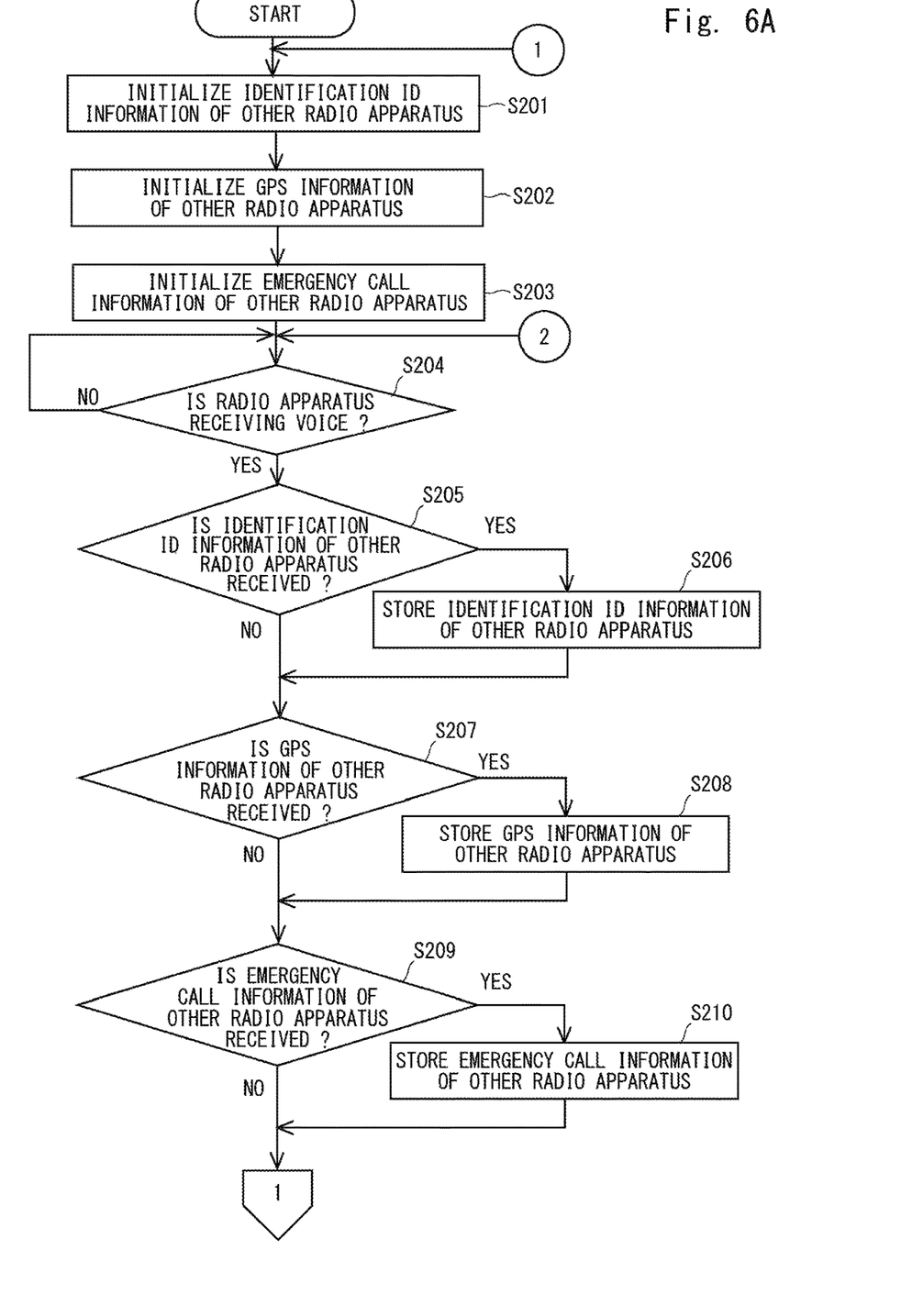
FIG. 6A is a flowchart showing an example of operations performed by the radio apparatus according to the first embodiment.
Figure 6B:
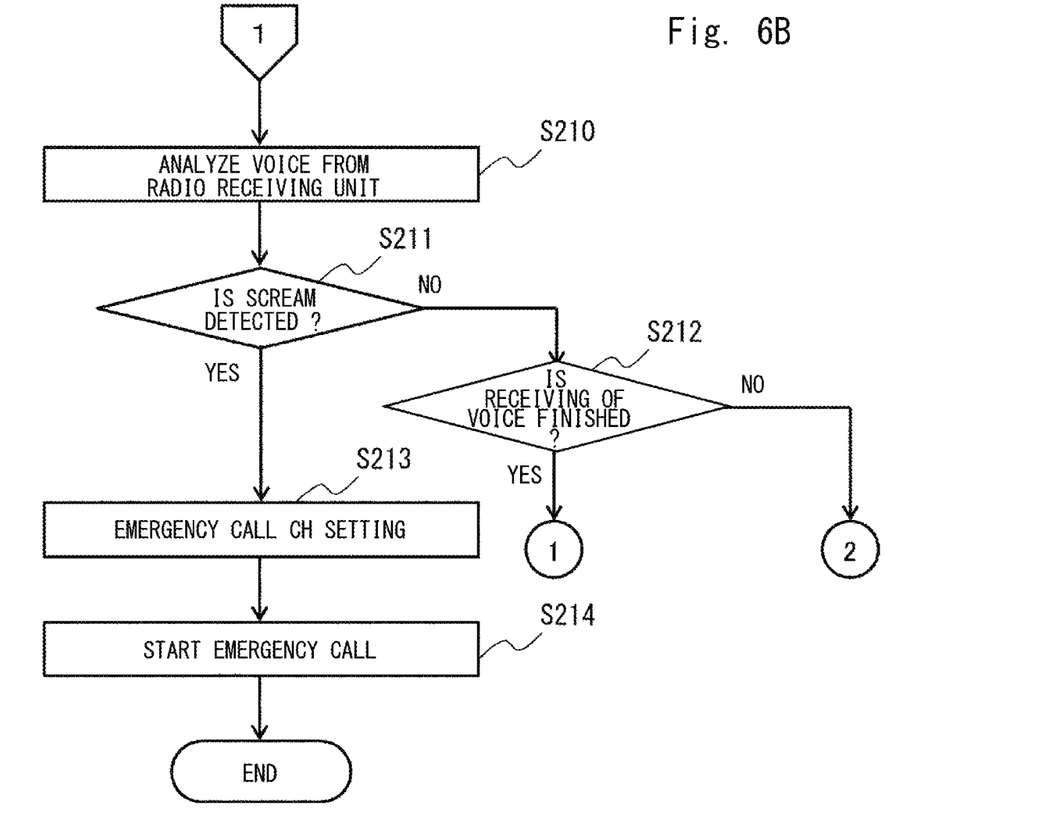
FIG. 6B is a flowchart showing an example of operations performed by the radio apparatus according to the first embodiment.

FIGS. 6A and 6B show an example of operations performed by a listening-side radio apparatus 1 (e.g., the radio apparatus 1A) according to this embodiment. As shown in FIGS. 6A and 6B, firstly, the control unit 10 initializes the identification ID information of the radio apparatus at the other end stored in the storage unit 11 (S201), initializes the GPS information of the radio apparatus at the other end stored in the storage unit 11 (S202), and initializes the emergency call information of the radio apparatus at the other end stored in the storage unit 11 (S203). Next, the control unit 10 determines whether or not its own radio apparatus is receiving a voice (S204). Then, when the radio apparatus is not receiving a voice (S204/No), the control unit 10 waits until the radio apparatus receives a voice.

When the radio apparatus has started receiving a voice (S204/Yes), the control unit 10 (the proxy call information acquisition unit 10b) acquires proxy call information multiplexed in the voice data in a state in which the radio apparatus is performing a call (i.e., performing communication) with the radio apparatus at the other end. Specifically, the control unit 10 determines whether or not the radio apparatus has received the identification ID information of the radio apparatus at the other end (S205). Then, when the radio apparatus has received the identification ID information of the radio apparatus at the other end (S205/Yes), the control unit 10 stores the received identification ID information of the radio apparatus at the other end in the storage unit 11 (S206). When the radio apparatus has not received the identification ID information of the radio apparatus at the other end (S205/No), or after the control unit 10 has stored the identification ID information of the radio apparatus at the other end (S206), the control unit 10 determines whether or not the radio apparatus has received the GPS information of the radio apparatus at the other end (S207). Then, when the radio apparatus has received the GPS information of the radio apparatus at the other end (S207/Yes), the control unit 10 stores the received GPS information of the radio apparatus at the other end in the storage unit 11 (S208). When the radio apparatus has not received the GPS information of the radio apparatus at the other end (S207/No), or after the control unit 10 has stored the GPS information of the radio apparatus at the other end (S208), the control unit 10 determines whether or not the radio apparatus has received emergency call information such as a transmission destination of an emergency call of the radio apparatus at the other end and information about a CH frequency (S209). Then, when the radio apparatus has received the emergency call information of the radio apparatus at the other end (S209/Yes), the control unit 10 stores the received emergency call information of the radio apparatus at the other end in the storage unit 11 (S210). When the radio apparatus has not received the emergency call information of the radio apparatus at the other end (S209/No), or after the control unit 10 has stored the emergency call information of the radio apparatus at the other end (S210), the control unit 10 performs the next process.

Next, while the radio apparatus is receiving a voice, the voice analysis unit 20 analyzes the voice from the radio receiving unit 17 (S210). For example, the voice analysis unit 20 determines whether or not it has detected a "scream" of the radio apparatus at the other end based on the predetermined keyword (S211). When the voice analyzer 20 has not detected any "scream" of the radio apparatus at the other end (S211/No), it determines whether or not the receiving of the voice has been finished (S212). When the receiving of the voice has not been finished (S212/No), the radio apparatus repeats the voice receiving process (S204) and the subsequent processes. When the receiving of the voice has been finished (S212/Yes), the process returns to the initialization of the identification ID information of the radio apparatus at the other end (S201).

When the voice analysis unit 20 detects a "scream" of the radio apparatus at the other end (S211/Yes), the control unit 10 (the proxy call unit 10c) sets an emergency call channel based on the proxy call information acquired from the radio apparatus at the other end (S213) and transmits an emergency call start to the destination of the emergency call of the radio apparatus at the other end on behalf of the radio apparatus at the other end (S214).

<Effect of First Embodiment>

In this embodiment, in a radio system in which a call is made from a speaking-side radio apparatus to a listening-side radio apparatus, the listening-side radio apparatus starts an emergency call on behalf of the speaking-side radio apparatus. In this way, even if an accidental event such as an event in which the battery is immediately removed by an assailant or the battery is detached as the speaker accidentally drops the radio apparatus occurs in the speaking-side radio apparatus, an emergency call can be reliably made by the listening-side radio apparatus. For example, when the listening-side radio apparatus detects a "scream" of the speaker through voice recognition processing, the listening-side radio apparatus starts an emergency call on behalf of the speaking-side radio apparatus, so that the emergency call can be quickly made without having the speaker (or the listener) perform any operation for the emergency call.

Further, when the listening-side radio apparatus makes an emergency call on behalf of the speaking-side radio apparatus, the listening-side radio apparatus uses the information such as the identification ID, the GPS information, and the destination of the emergency call of the speaking-side radio apparatus which were received in advance from the speaking-side radio apparatus during a call. In this way, substantially the same information can be sent to the same system radio apparatus as in the case under the normal circumstances where the speaking-side radio apparatus itself makes an emergency call.

Second Embodiment

Next, a second embodiment will be described. In this embodiment, in addition to the operations in the first embodiment, the listening-side radio apparatus monitors an emergency call made from the speaking-side radio apparatus, and makes a proxy emergency call depending on whether or not an emergency call has been made from the speaking-side radio apparatus within a predetermined period.

Figure 7:
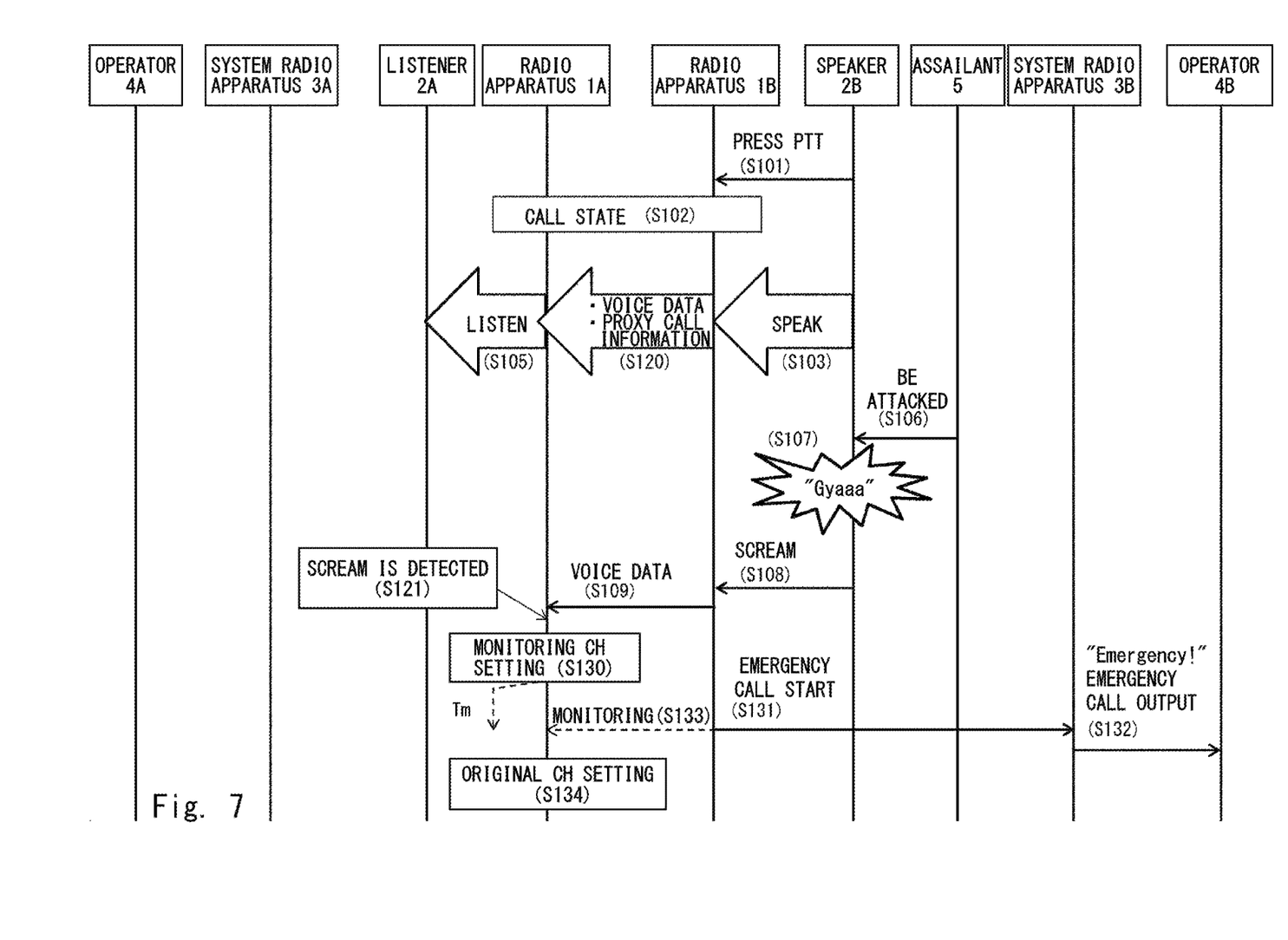
FIG. 7 is a sequence diagram showing an example of operations performed by a radio apparatus according to the second embodiment.
Figure 8:
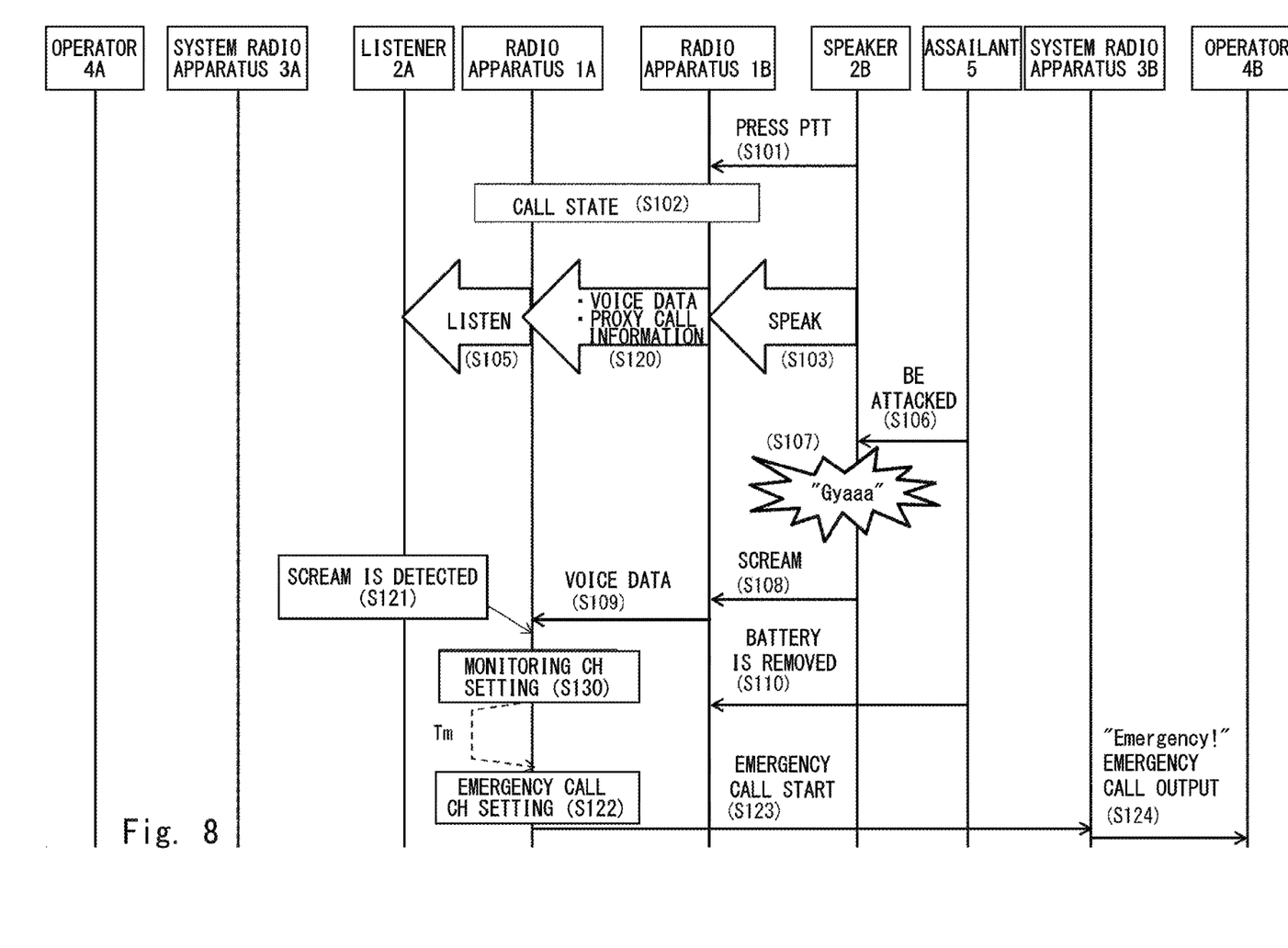
FIG. 8 is a sequence diagram showing an example of operations performed by the radio apparatus according to the second embodiment.

FIGS. 7 and 8 show operations performed by a radio communication system according to this embodiment. Operations that are performed from the start of a call to the detection of a scream (S101-S109 and S121) are the same as those of the first embodiment.

That is, as shown in FIG. 7, in a call state from the radio apparatus 1B of the speaker 2B to the radio apparatus 1A of the listener 2A (S102), proxy call information such as emergency call information is transmitted together with voice data (S120). When the speaker 2B is attacked by an assailant 5 and lets out a "scream" (S107), the voice data of the "scream" is transmitted from the radio apparatus 1B (S109) and the radio apparatus 1A detects the "scream" (S121).

As a result, in this embodiment, in order to check whether or not the radio apparatus 1B has made an emergency call on its own, the radio apparatus 1A adjusts the setting for the receiving CH to the transmitting CH setting of the CH information for an emergency call which was received in advance from the radio apparatus 1B (S130), and starts a monitoring operation. When doing so, the radio apparatus 1A starts a timer Tm for continuing the monitoring state.

When the speaking-side radio apparatus 1B starts an emergency call to the system radio apparatus 3B (S131), the system radio apparatus 3B outputs the emergency call of the radio apparatus 1B for the operator 4B (S132). When the listening-side radio apparatus 1A monitors (i.e., detects) the start of the emergency call made from the speaking-side radio apparatus 1B (S133), the radio apparatus 1A stops the timer, returns the CH setting to the original one (S134), and returns to the state in which the radio apparatus 1A can perform the subsequent normal operation.

On the other hand, as shown in FIG. 8, when the radio apparatus 1A cannot confirm that the radio apparatus 1B has started an emergency call on its own while it continues the monitoring state (i.e., before the timer expires) and the timer eventually expires, the listening-side radio apparatus 1A adjusts the CH setting to the one for an emergency call which was received in advance from the speaking-side radio apparatus 1B (S122), starts the emergency call to the system radio apparatus 3B which is the destination of the emergency call of the radio apparatus 1B (S123), and transmits the identification ID and GPS position information of the radio apparatus 1B. The system radio apparatus 3B outputs the emergency call of the radio apparatus 1B having these identification ID and the GPS position information for the operator 4B (S124).

Figure 9A:
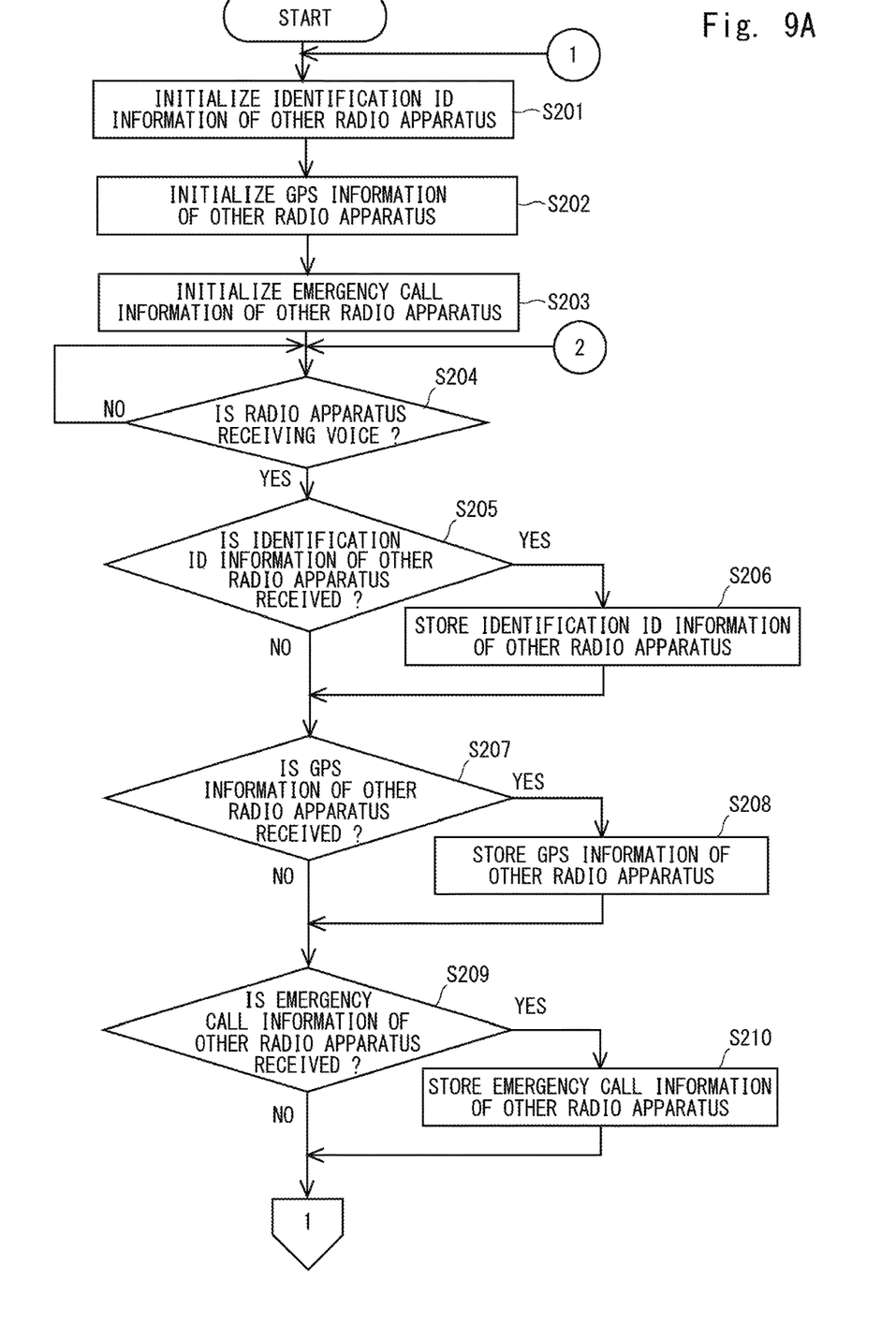
FIG. 9A is a flowchart showing an example of operations performed by the radio apparatus according to the second embodiment.
Figure 9B:
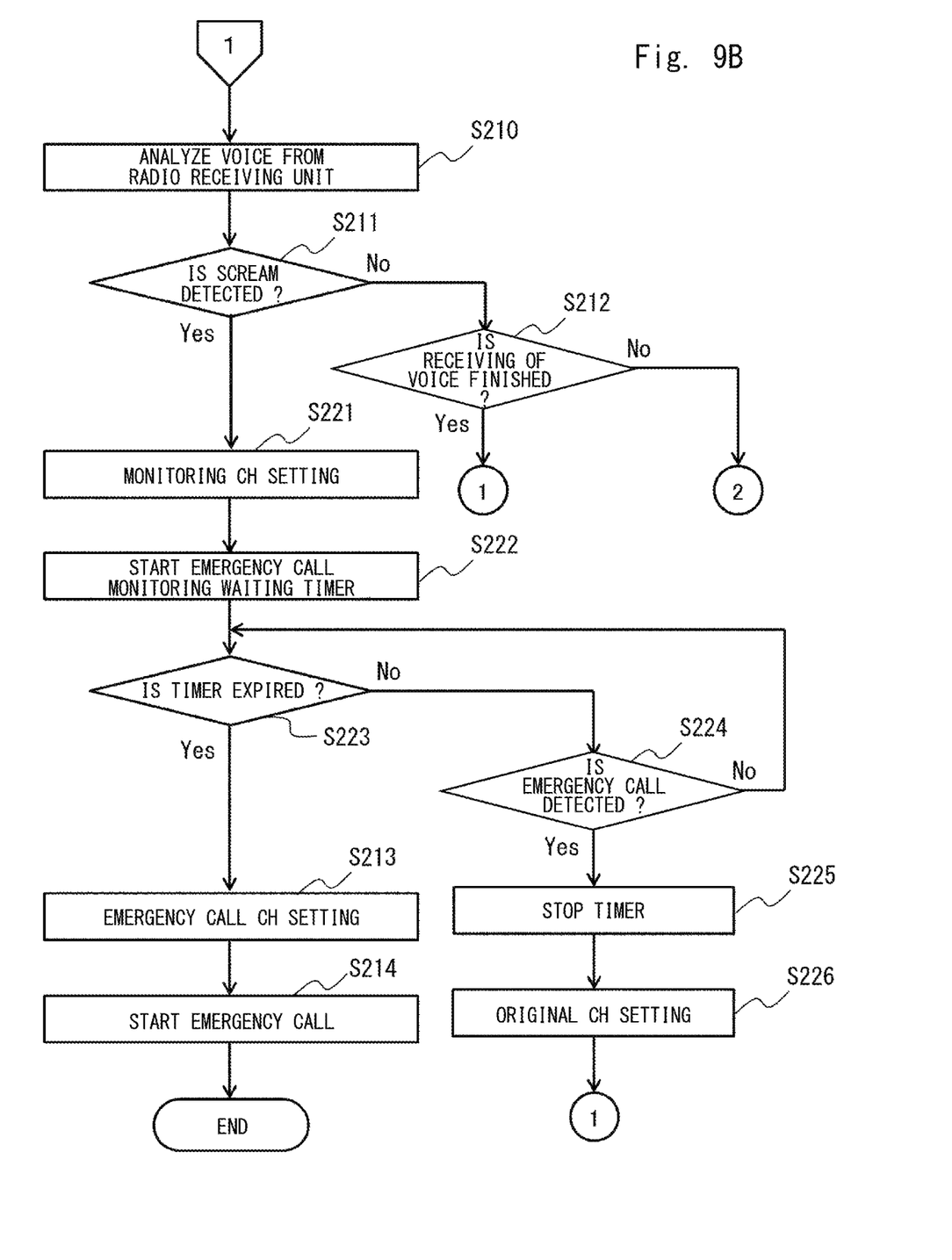
FIG. 9B is a flowchart showing an example of operations performed by the radio apparatus according to the second embodiment.

FIGS. 9A and 9B show an example of operations performed by a listening-side radio apparatus 1 (e.g., the radio apparatus 1A) according to this embodiment. Operations for initializing each information, receiving each information during the receiving of a voice, and detecting a scream (S201 to S211), and operations that are performed when no scream has been detected (S212) are the same as those in the first embodiment. In this embodiment, as shown in FIG. 9B, the voice analysis unit 20 determines whether or not it has detected a "scream" of the radio apparatus at the other end (S211). Then, when the voice analysis unit 20 detects a "scream" of the radio apparatus at the other end (S211/Yes), the control unit 10 sets a CH to be monitored based on the emergency call information of the radio apparatus at the other end (S221), and starts an emergency call monitoring waiting timer (S222). The control unit 10 determines whether or not the timer has expired (S223). Then, when the timer has not expired (S223/No), the control unit 10 determines whether or not an emergency call of the radio apparatus at the other end has been detected (S224). When no emergency call of the radio apparatus at the other end is detected by the monitoring (S224/No), the control unit 10 waits until the timer expires. When an emergency call of the radio apparatus at the other end is detected (S224/Yes), the control unit 10 stops the timer (S225) and sets the original channel (S226).

When no emergency call of the radio apparatus at the other end is detected and the timer expires (S223/Yes), the control unit 10 sets a channel for an emergency call of the radio apparatus at the other end based on the proxy call information of the radio apparatus at the other end (S213) and starts the emergency call to the destination of the emergency call of the radio apparatus at the other end (S214).

<Effect of Second Embodiment>

In this embodiment, in a system in which a radio apparatus of a listener starts an emergency call on behalf of a radio apparatus of a speaker as in the case of the first embodiment, when the radio apparatus of the speaker has successfully started an emergency call on its own, the radio apparatus of the listener does not start the emergency call. In this way, since the radio apparatus of the listener does not make an unnecessary emergency call, it is possible to use the radio apparatus of the listener as usual without any restriction. Further, it is possible to reduce the communication load (e.g., traffic) for the system radio apparatus.

As described above with reference to the embodiments, according to the embodiments, it is possible to provide a radio apparatus, a radio communication system, and a radio communication method capable of making an emergency call more reliably.

Note that the present disclosure is not limited to the above-described embodiments and they can be modified as desired without departing from the scope and spirit of the present disclosure. For example, the above-described embodiments are not limited to the radio apparatuses for radio systems for business use. For example, they may be applied to general-purpose radio communication apparatuses such as mobile phones and smartphones.

Note that the radio apparatus in the above-described embodiments may be constructed by software, hardware, or both of them. Further, the radio apparatus may be constructed by one hardware device or one software program, or a plurality of hardware devices or a plurality of software programs. Each function (each process) of the radio apparatus may be implemented by a computer having a CPU, a memory, or the like. For example, a program for performing a radio communication method according to the embodiment may be stored in a storage unit, and each function may be implemented by having a CPU execute the program stored in the storage unit.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio apparatus comprising:
   a communication unit configured to wirelessly communicate with a radio apparatus at the other end of the communication;
   a voice recognition unit configured to analyze a voice received from the radio apparatus at an other end through the radio communication and to recognize a predetermined voice;
   a proxy call information acquisition unit configured to acquire proxy call information from the radio apparatus at the other end through the radio communication, the proxy call information being information that is required in case of an emergency of the radio apparatus at the other end; and
   a proxy call unit configured to make an emergency call on behalf of the radio apparatus at the other end based on the proxy call information,
   wherein the proxy call unit transmits the emergency call when the voice recognition unit recognizes the predetermined voice in the voice received from the radio apparatus at the other end;
   wherein when an emergency call is made from the radio apparatus at the other end within a predetermined period after the voice recognition unit recognized the predetermined voice, the proxy call unit does not transmit the emergency call.

2. The radio apparatus according to claim 1, wherein the predetermined voice is a voice containing at least one of a voice containing a predetermined keyword, a voice containing a scream, and a voice whose volume in a predetermined period is larger than a predetermined volume.

3. The radio apparatus according to claim 1, wherein the proxy call information acquisition unit acquires the proxy call information in a state in which the radio apparatus is performing a call with the radio apparatus at the other end.

4. The radio apparatus according to claim 1, wherein the proxy call information includes at least one of identification information of the radio apparatus at the other end, position information of the radio apparatus at the other end, information about a destination of the emergency call, and information about a channel of the emergency call.

5. A radio communication system comprising:
   a radio apparatus on a speaking side; and
   a radio apparatus on a listening side, wherein the radio apparatus on the speaking side comprises:
   a communication unit configured to wirelessly communicate with the radio apparatus on the listening side; and
   a proxy call information transmitting unit configured to transmit proxy call information to the radio apparatus on the listening side through the radio communication, the proxy call information being information that is required in case of an emergency of the radio apparatus on the speaking side, and the radio apparatus on the listening side comprises: a communication unit configured to wirelessly communicate with the radio apparatus on the speaking side;
   a voice recognition unit configured to recognize a predetermined voice in the radio communication;
   a proxy call information acquisition unit configured to acquire the proxy call information from the radio apparatus on the speaking side through the radio communication; and a proxy call unit configured to make an emergency call on behalf of the radio apparatus on the speaking side based on the proxy call information, wherein the proxy call unit transmits the emergency call when the voice recognition unit recognizes the predetermined voice;

wherein when an emergency call is made from the radio apparatus at the other end within a predetermined period after the voice recognition unit recognized the predetermined voice, the proxy call unit does not transmit the emergency call.

6. A radio communication method comprising:

wirelessly communicating with a radio apparatus at the other end of the communication;

analyzing a voice received from the radio apparatus at an other end through the radio communication and to recognize a predetermined voice;

acquiring proxy call information from the radio apparatus at the other end through the radio communication, the proxy call information being information that is required in case of an emergency of the radio apparatus at the other end;

making an emergency call on behalf of the radio apparatus at the other end based on the proxy call information; and transmitting the emergency call when the predetermined voice is recognized in the voice received from the radio apparatus at the other end;

wherein when an emergency call is made from the radio apparatus at the other end within a predetermined period after the voice recognition unit recognized the predetermined voice, the proxy call unit does not transmit the emergency call.

* * * * *